United States Patent
Moon et al.

(10) Patent No.: US 6,270,141 B2
(45) Date of Patent: *Aug. 7, 2001

(54) POWER ASSISTED SEAT FOLDING MECHANISM

(75) Inventors: Joseph J. Moon, Clawson; Majid Jack Hammoud, Dearborn, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/447,134

(22) Filed: Nov. 22, 1999

(51) Int. Cl.$^7$ ................................................ B60N 2/02
(52) U.S. Cl. ........................... 296/65.17; 296/65.08; 297/378.1
(58) Field of Search ........................... 296/65.05, 65.08, 296/65.17, 65.18; 297/330, 378.1, 362.11

(56) References Cited

U.S. PATENT DOCUMENTS

| | | |
|---|---|---|
| 3,114,574 | 12/1963 | Pryale . |
| 4,627,656 | 12/1986 | Gokimoto et al. . |
| 4,736,985 | 4/1988 | Fourrey et al. . |
| 5,195,795 | 3/1993 | Cannera et al. . |
| 5,393,116 | 2/1995 | Bolsworth et al. . |
| 5,482,349 | 1/1996 | Richter et al. . |
| 5,570,931 | * 11/1996 | Kargilis et al. . |
| 5,588,707 | 12/1996 | Bolsworth et al. . |
| 5,702,155 | * 12/1997 | Ito . |
| 5,934,732 | 8/1999 | Jakubiec . |
| 6,070,934 | * 6/2000 | Schaefer et al. . |
| 6,079,763 | * 6/2000 | Clemente . |
| 6,089,641 | * 7/2000 | Mattarella et al. . |
| 6,106,046 | * 8/2000 | Reichel . |
| 6,113,191 | * 9/2000 | Seibold . |
| 6,123,380 | * 9/2000 | Sturt et al. . |

FOREIGN PATENT DOCUMENTS 2 251 183   7/1992   (GB) .

* cited by examiner

Primary Examiner—D. Glenn Dayoan
Assistant Examiner—Scott Carpenter
(74) Attorney, Agent, or Firm—Mark L. Mollon

(57) ABSTRACT

A vehicle seat assembly for a vehicle floor includes a seat back frame pivotally connected with respect to the vehicle floor for movement between a fully reclined position for seating and a horizontal position for forming a load floor. A drive motor is connected to the seat back and operative to adjust the reclined position of the seat back frame with respect to the vehicle floor and operative to pivot the seat back frame between the fully reclined and horizontal positions.

1 Claim, 5 Drawing Sheets

POWER ASSISTED SEAT FOLDING MECHANISM

TECHNICAL FIELD

The present invention relates to a vehicle seat assembly including a motor operative to adjust the reclined position of a seat back and also operative to fold the seat back forward to a load floor position.

BACKGROUND OF THE INVENTION

Many modern vehicle designs include foldable and collapsible rear seat assemblies to improve cargo capacity of vehicles, particularly minivans and SUVs. Some vehicles provide seat assemblies which are collapsible to a substantially flat position in the vehicle to create a cargo load floor wherein vehicle cargo is supported on top of the flattened seat assemblies. However, such assemblies are typically complex, bulky, and cumbersome for the average user to operate. Generally, the seat assemblies are heavy and require actuation of release levers, which may cause difficulty in collapsing the seat assembly within the confined space of a vehicle interior.

It is, therefore, desirable to provide a vehicle seat assembly which does not require manual operation for collapsing the assembly to a load floor position.

DISCLOSURE OF THE INVENTION

The present invention overcomes the above-referenced shortcomings of prior art collapsible vehicle seat assemblies by providing a vehicle seat assembly including a drive motor connected to a seat back and operative both to adjust the reclined position of the seat back and to flatten the seat back to a horizontal, load floor position.

More specifically, the present invention provides a vehicle seat assembly for a vehicle floor, including a seat back frame pivotally connected with respect to the vehicle floor for movement between a fully reclined position for seating and a horizontal position for forming a load floor. A drive motor is connected to the seat back and operative to adjust the reclined position of the seat back frame with respect to the vehicle floor and further operative to pivot the seat back frame between the fully reclined and horizontal positions.

In this manner, the vehicle seat assembly may be collapsed to a load floor position by the push of a button, rather than manually collapsing the seat assembly.

Accordingly, an object of the invention is to provide a vehicle seat assembly including a drive motor which is operative both to adjust the reclined position of the seat back and to collapse the seat assembly to a horizontal, load floor position.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
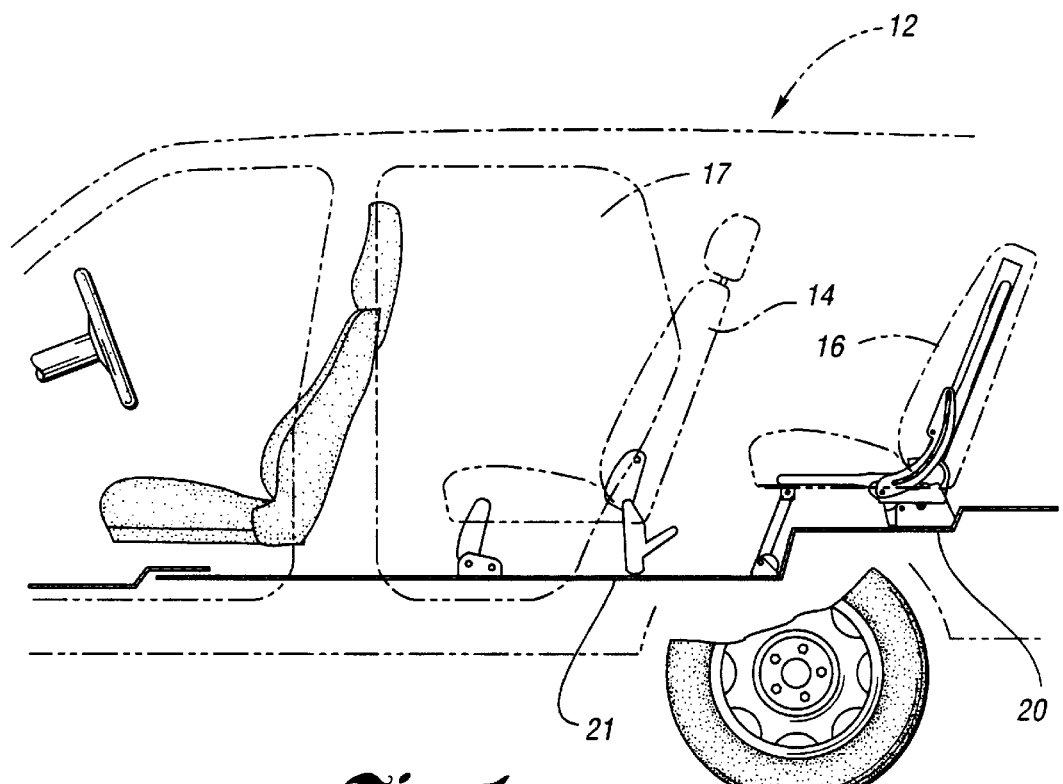
FIG. 1 is a side view of a seating arrangement within a motor vehicle with all seats in the upright seating position in accordance with the present invention.
Figure 2:
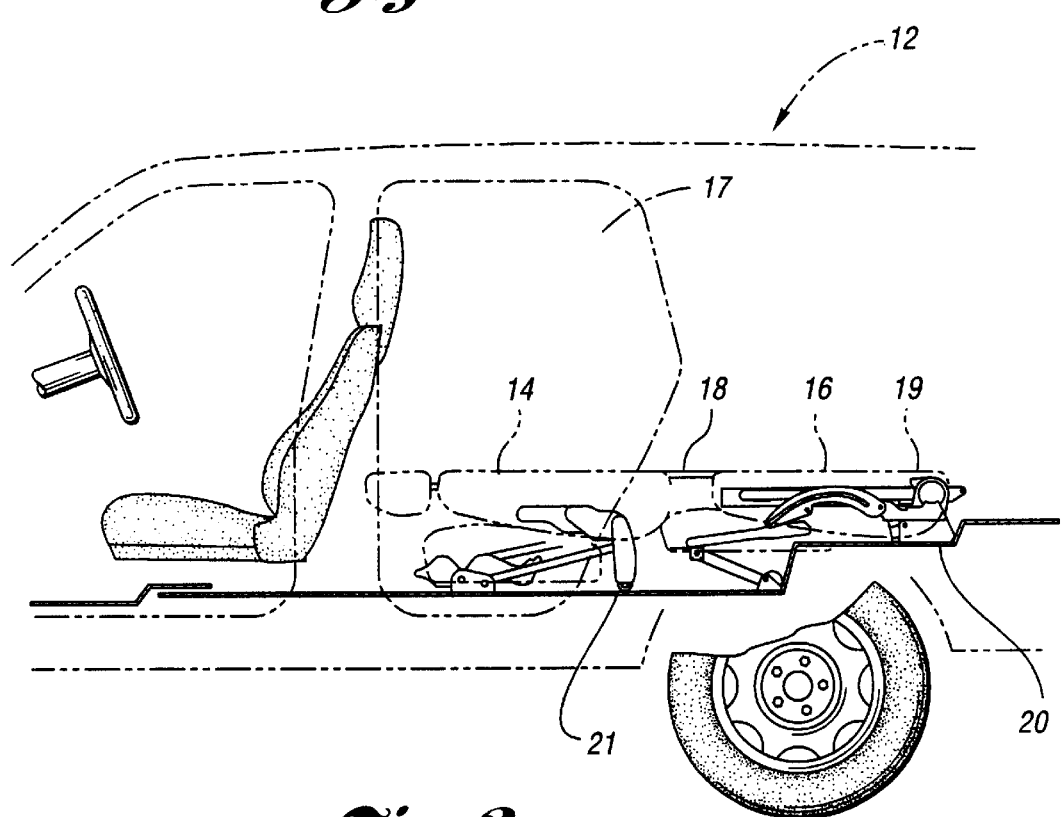
FIG. 2 is a side view of a seating arrangement within a motor vehicle with the third row seat in the dropped and folded position in accordance with the present invention.
Figure 3:
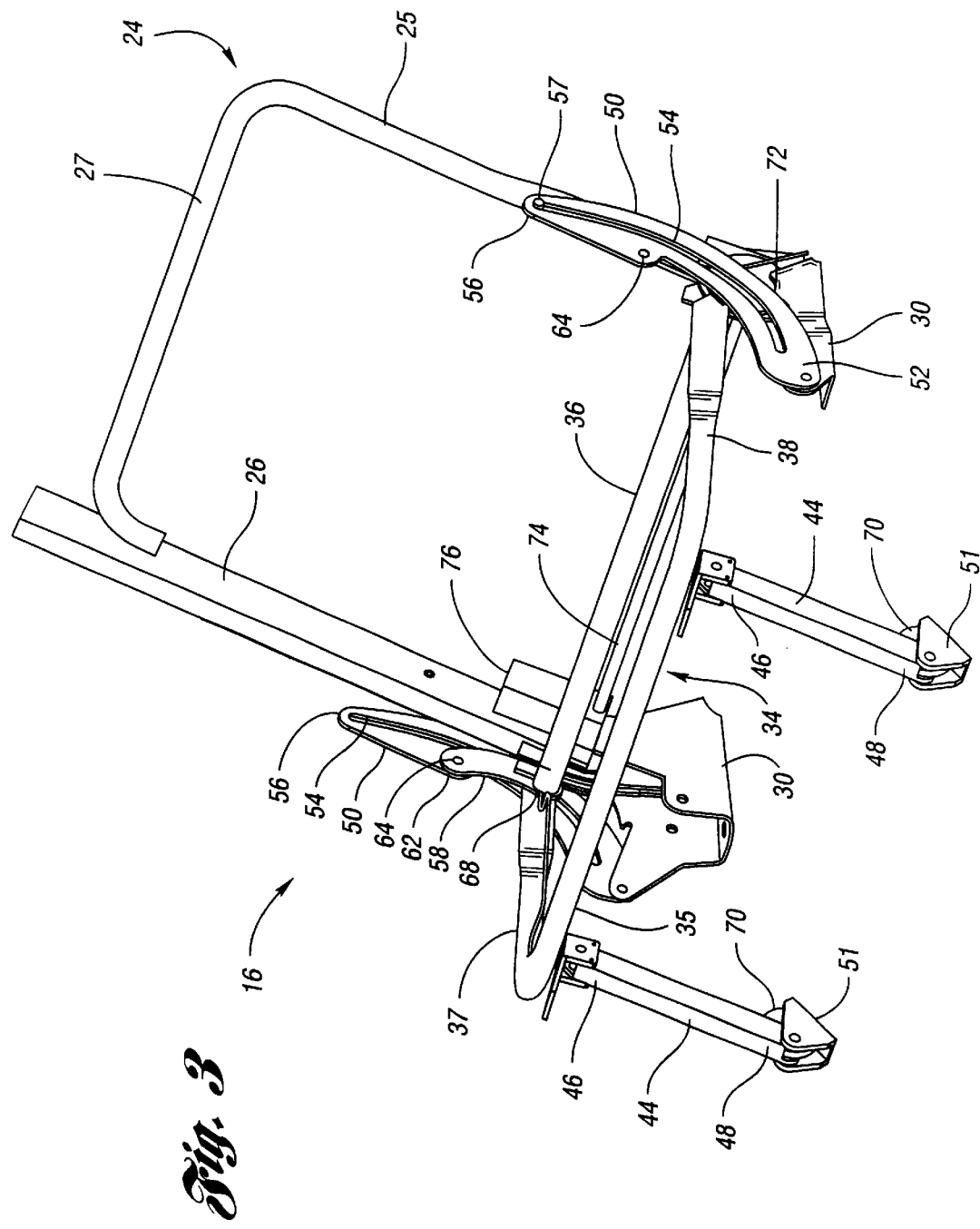
FIG. 3 is a perspective view of a seat frame assembly constructed in accordance with the present invention.
Figure 4:
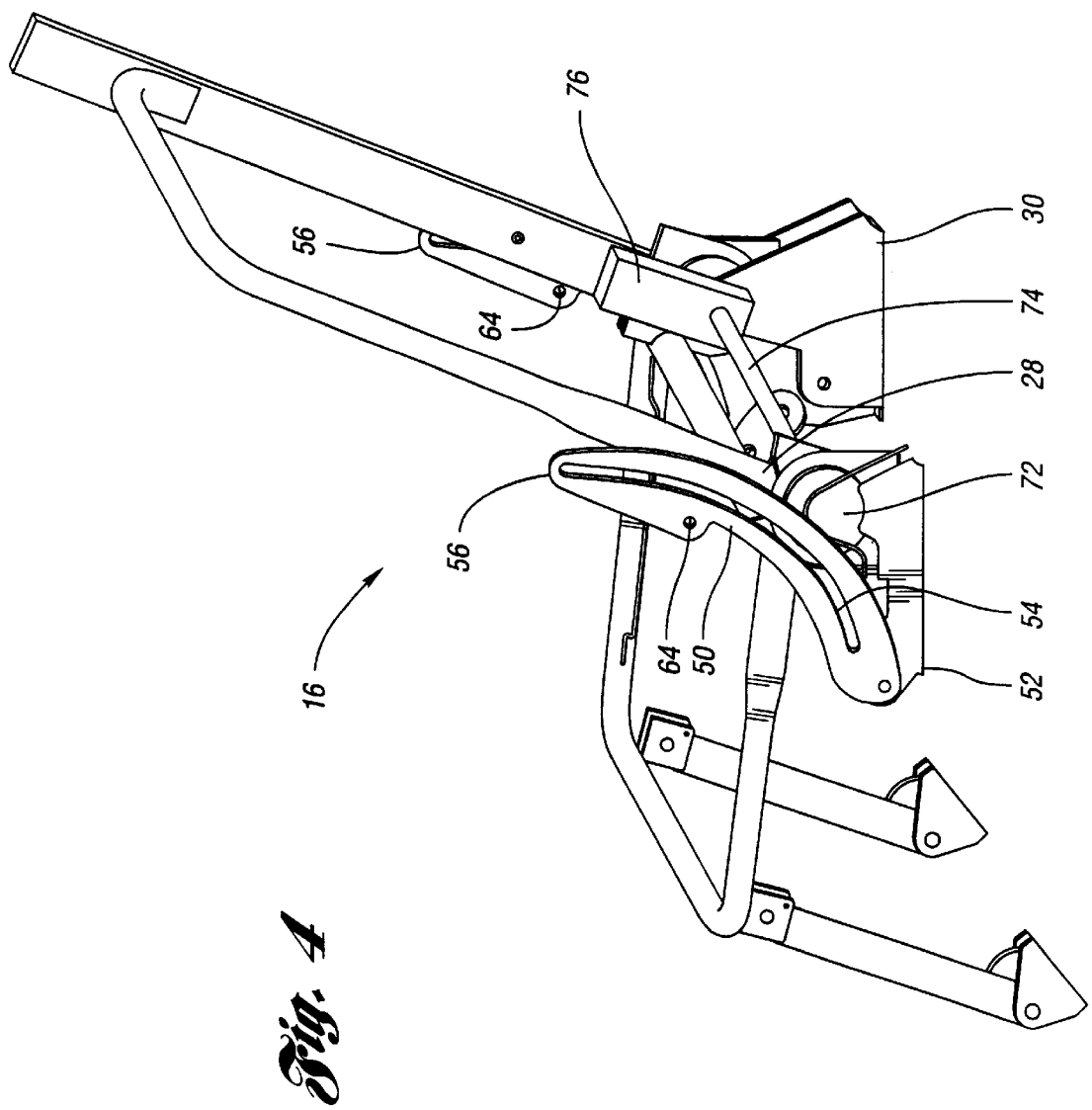
FIG. 4 is a reverse perspective view of the assembly of FIG. 3.

Referring to FIGS. 1 and 2, a seating arrangement is shown for use with the present invention. This embodiment is only shown for exemplary purposes, and the present invention may be used with any variety of collapsible vehicle seat assemblies. FIGS. 1 and 2 show a three-row seating arrangement of a motor vehicle 12. Typically, passengers enter and exit the second row seats 14 and third row seats 16 through a second entrance 17. When it is desired to provide maximum cargo capability for the vehicle, the present invention allows the third row seat 16 to drop and fold from an upright seating position to a folded position by the push of a button such that the third row seat 16 rests above both a lower floor 21 and an upper floor 20. The third row seat 16 combines with the second row seat 14 to provide a substantially flat load floor 19. A gap filler 18 may be provided to complete the load floor 19 between the second row seat 14 and third row seat 16.

Referring now to FIGS. 3–6, various views of the third row seat 16 are shown and will now be described. To simplify the description of the third row seat 16, only one side will be described, it being understood that both sides, unless otherwise mentioned, are symmetrically opposite. Furthermore, while the preferred embodiment discloses a third row seat as an example of the present invention, it should be understood that the present invention can be incorporated into any row within the motor vehicle.

The third row seat 16 includes a seat back frame 24 and a lower seat frame 34 enclosed in cushions for comfort. The cushions are shown in FIGS. 1 and 2, but have been removed from FIGS. 3–6 for clarity.

Referring now to FIGS. 3–6, the seat back frame 24 includes a right back side 26 and a left back side 25 located opposite therefrom, an upper end 27 interconnecting the right and left back sides 26,25, and a lower end 28 pivotally attached to right and left upper floor mounting brackets 30 which are securely attached to the upper floor 20. Slider pins 57 are attached to the right and left back sides 26,25, respectively, of the seat back frame 24.

The slider pins 57 slidably engage with slots 54 of slotted links 50. The slotted links 50 include first ends 52 pivotally connected to the upper floor mounting brackets 30 and second ends 56 opposite the first ends 52. Each of the slots 54, in the form of an arcuate slot, extends from a position substantially adjacent to the first end 52 to the second end 56. Intermediate pivot points 64 of the slotted links 50 are positioned intermediate of the first ends 52 and the second ends 56.

Second ends 62 of rear links 58 pivotally attach to the intermediate pivot points 64 on the slotted links 50. The rear links 58 extend downwardly and include first ends 68 rigidly attached to right and left bottom sides 37,38, respectively, of the lower seat frame 34.

The lower seat frame 34 is positioned adjacent to the seat back frame 24 with the third row seat 16 in the upright seating position. The lower seat frame 34 includes a forward end 35 and a rearward end 36, with the right and left bottom sides 37,38 interconnecting the forward and rearward ends 35,36.

First and second front legs 44 support the forward end 35 of the lower seat frame 34 above the lower floor 21 of the vehicle. The front legs 44 include first ends 46 pivotally connected to the right and left bottom sides 37,38, respectively, of lower seat frame 34 and second ends 48 pivotally attach to lower floor mounting brackets 51. Counterbalance springs 70 are provided between the second ends 48 and the lower floor mounting brackets 51.

Figure 5:
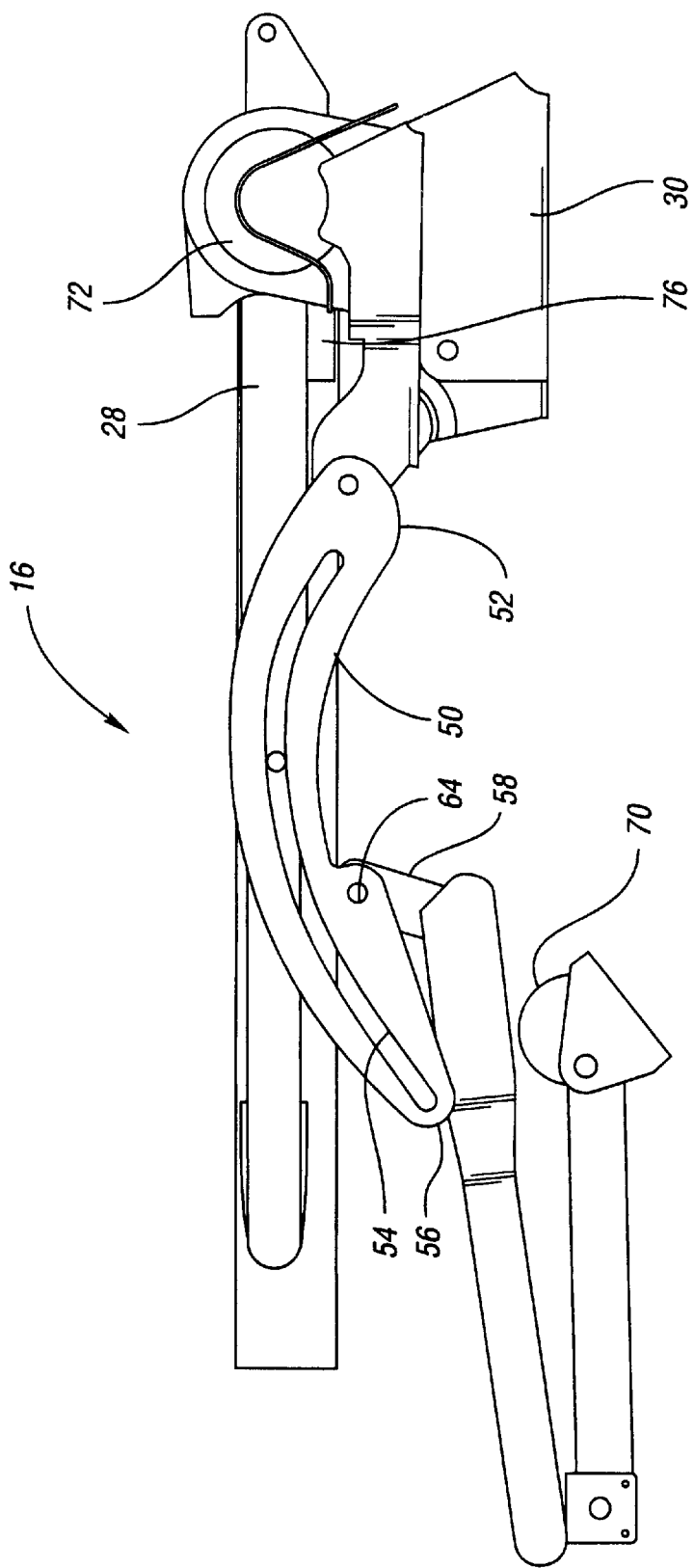
FIG. 5 is a side view of the assembly of FIG. 3 in the collapsed position.
Figure 6:
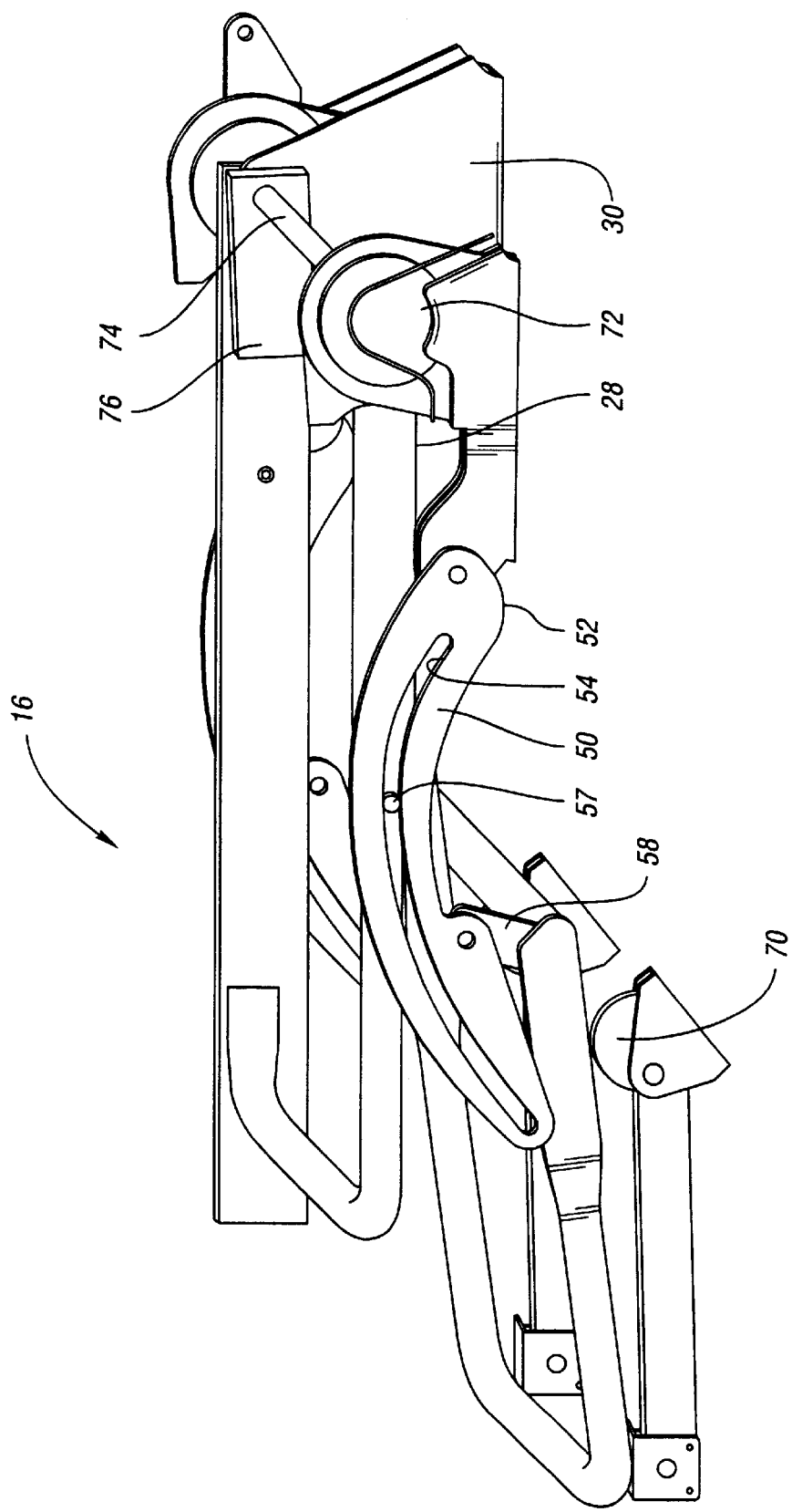
FIG. 6 is a perspective view of the assembly of FIG. 3 in the collapsed position.

The seat assembly 16 also includes a seat back recliner 72, a synchronizing rod 74, and a drive motor and gear reduction device 76 for adjusting the reclined position of the seat back 24, and for collapsing the seat back 24 to the load floor position shown in FIGS. 5 and 6.

The recliner 72 is a conventional recliner, such as a "rotary recliner" or "disk recliner" available from Faurecia Corporation of Troy, Mich. or Keiper Delta Corporation of Warren, Mich.. The recliner 72 need only be modified slightly to enable the full range of pivotal movement of the seat back frame 24 from the fully reclined position shown in FIGS. 3 and 4 to the horizontal position shown in FIGS. 5 and 6. This modification is within the skill level of one of ordinary skill in the art instructed to do so, and would vary slightly depending upon the conventional recliner selected, and is therefore not described herein in detail.

Accordingly, with the present invention, the recliner 72 is used for adjusting the reclined position of the seat back 25 with respect to the vehicle floor, and is also used for folding the seat back 24 to the horizontal position when driven by the motor and gear reduction system 76. A control button would preferably be provided in a side panel behind the seat 16, or as part of the driver controls in the front of the vehicle. A single push of this control button would cause the seat back 24 to collapse to the load floor position shown in FIGS. 2, 5 and 6.

While the best mode for carrying out the invention has been described in detail, those familiar with the art to which this invention relates will recognize various alternative designs and embodiments for practicing the invention within the scope of the appended claims.

What is claimed is:

1. A vehicle seat assembly for a vehicle floor comprising:

a seat back frame pivotally connected to the vehicle floor for movement between a fully reclined position for seating and a horizontal position for forming a load floor;

a drive motor connected to the seat back frame and operative to adjust the reclined position of the seat back frame with respect to the vehicle floor and operative to pivot the seat back frame between the fully reclined and horizontal positions;

a lower seat frame having a forward end and a rearward end disposed adjacent to said seat back frame when said seat back frame is in the fully reclined position;

a first leg having a first end pivotally connected to said lower seat frame and having a second end pivotally connected to the floor;

a first slotted link having a first end pivotally connected to the floor and a slot extending from a position substantially adjacent to said first end of the first slotted link to a second end opposite said first end of the first slotted link, said slot being slidably engaged with a slider pin disposed on said seat back frame; and a first rear link having a first end rigidly attached to said seat bottom frame and a second end pivotally attached to an intermediate pivot point on said first slotted link, said intermediate pivot point being disposed intermediate of said first and second ends of said first slotted link;

whereby upon movement of said seat back frame from the fully reclined position to the horizontal position, said first slotted link together with said first rear link operatively position said lower seat frame forward and downward such that the seat back frame lies substantially flat and parallel to said floor, and said lower seat frame moves forward and downward to a stowage position.

* * * * *